(12) United States Patent
Khan et al.

(10) Patent No.: US 12,512,888 B2
(45) Date of Patent: Dec. 30, 2025

(54) METHOD AND DEVICE FOR BEAM TRAINING FOR AN INTELLIGENT REFLECTING SURFACE (IRS) ASSISTED CELLULAR SYSTEM

(71) Applicant: Samsung Electronics Co., Ltd., Suwon-si (KR)

(72) Inventors: Mohammed Saquib Noorulhuda Khan, Bangalore (IN); Ashok Kumar Reddy Chavva, Bangalore (IN); Anusha Gunturu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 485 days.

(21) Appl. No.: 18/311,782

(22) Filed: May 3, 2023

(65) Prior Publication Data

US 2023/0361826 A1    Nov. 9, 2023

(30) Foreign Application Priority Data

May 4, 2022   (IN) .............................. 202241025924
Apr. 21, 2023   (IN) .............................. 202241025924

(51) Int. Cl.
*H04B 7/06*   (2006.01)
*H04B 7/04*   (2017.01)
*H04B 17/318*   (2015.01)

(52) U.S. Cl.
CPC ....... *H04B 7/0617* (2013.01); *H04B 7/04013* (2023.05); *H04B 17/328* (2023.05)

(58) Field of Classification Search
CPC . H04B 7/0617; H04B 17/328; H04B 7/04013
(Continued)

(56) References Cited

U.S. PATENT DOCUMENTS

| 7,113,284 B1* | 9/2006 | Meeks ................. G01B 11/306 257/E21.53 |
| 2006/0055941 A1* | 3/2006 | Meeks ............... G01B 11/0616 356/601 |

(Continued)

FOREIGN PATENT DOCUMENTS

| CN | 111245492 A | 6/2020 |
| CN | 113114311 A | 7/2021 |

(Continued)

OTHER PUBLICATIONS

Examination Report dated Apr. 1, 2024, in connection with Indian Patent Application No. 202241025924, 7 pages.

(Continued)

*Primary Examiner* — April G Gonzales

(57) ABSTRACT

Disclosed is a method and device for beam training for an IRS assisted cellular system. The method performed by BS in the IRS assisted cellular system includes configuring the IRS in a retro-reflection mode to reflect a received beam in same direction of reception of the beam and determining a BS optimal Tx-Rx beam pair for a BS-IRS link. The method includes: configuring the IRS to receive a beam from the UE; configuring the IRS to determine an IRS optimal Tx-Rx beam pair for an IRS-UE link and receiving signalling information from the UE indicating the IRS optimal Tx-Rx beam pair; and transmitting to the UE, a beam through the BS optimal Tx-Rx beam pair which is received at the UE through the UE optimal Tx-Rx beam pair, wherein the IRS reflects the beam transmitted by the BS to the UE through the IRS optimal Tx-Rx beam pair.

20 Claims, 13 Drawing Sheets

(58) Field of Classification Search
USPC .......................................................... 455/561
See application file for complete search history.

(56) References Cited

U.S. PATENT DOCUMENTS

| | | | | |
|---|---|---|---|---|
| 2008/0316026 | A1* | 12/2008 | Yenisch | G01S 17/87 340/555 |
| 2009/0103925 | A1* | 4/2009 | Alpert | H04B 10/807 398/130 |
| 2009/0310784 | A1* | 12/2009 | Duligall | H04L 9/0852 380/278 |
| 2015/0168554 | A1* | 6/2015 | Aharoni | G01S 7/52046 250/493.1 |
| 2016/0034029 | A1* | 2/2016 | Lyons | H04L 67/06 715/748 |
| 2017/0176575 | A1* | 6/2017 | Smits | G01S 7/4808 |
| 2018/0246189 | A1* | 8/2018 | Smits | G01S 17/10 |
| 2018/0329204 | A1* | 11/2018 | Smits | G02B 26/105 |
| 2019/0257921 | A1* | 8/2019 | Smits | G01S 17/48 |
| 2019/0302264 | A1* | 10/2019 | Smits | G01S 7/4863 |
| 2020/0073115 | A1* | 3/2020 | Smits | G01S 17/931 |
| 2020/0191916 | A1* | 6/2020 | Smits | G01S 7/4808 |
| 2020/0275449 | A1* | 8/2020 | Je | H04B 7/0874 |
| 2021/0337617 | A1* | 10/2021 | Bao | H04W 76/18 |
| 2022/0014935 | A1* | 1/2022 | Haija | H04L 5/0048 |
| 2022/0155585 | A1* | 5/2022 | Smits | G02B 26/0816 |
| 2022/0196716 | A1* | 6/2022 | Anderson | G01R 29/0892 |
| 2025/0324387 | A1* | 10/2025 | Tao | H04B 17/328 |

FOREIGN PATENT DOCUMENTS

| | | | |
|---|---|---|---|
| WO | 2020254031 | A1 | 12/2020 |
| WO | 2022015965 | A1 | 1/2022 |

OTHER PUBLICATIONS

Gopi et al., "Intelligent Reflecting Surface Assisted Beam Index-Modulation for Millimeter Wave Communication," IEEE Transactions on Wireless Communications, vol. 20, Issue 2, Oct. 2020, 16 pages.

Wang et al., "Joint Beam Training and Positioning for Intelligent Reflecting Surfaces Assisted Millimeter Wave Communications," IEEE Transactions on Wireless Communications, vol. 20, Issue 2, Oct. 2020, 16 pages.

International Search Report and Written Opinion of the International Searching Authority dated Jul. 24, 2023, in connection with International Application No. PCT/KR2023/006045, 9 pages.

3GPP TS 38.321 V16.7.0 (Dec. 2021), Technical Specification, 3rd Generation Partnership Project; Technical Specification Group Radio Access Network; NR; Medium Access Control (MAC) protocol specification (Release 16), Dec. 2021, 158 pages.

Wu, et al., "Towards Smart and Reconfigurable Environment: Intelligent Reflecting Surface Aided Wireless," arXiv:1905.00152v5 [cs.IT], Aug. 30, 2019, 8 pages.

Supplementary European Search Report dated Jun. 3, 2025, in connection with European Patent Application No. 23799678.0, 7 pages.

Ning, et al., "Terahertz Multi-User Massive MIMO With Intelligent Reflecting Surface: Beam Training and Hybrid Beamforming," IEEE Transactions on Vehicular Technology, vol. 70, No. 2, Feb. 2021, 18 pages.

* cited by examiner

METHOD AND DEVICE FOR BEAM TRAINING FOR AN INTELLIGENT REFLECTING SURFACE (IRS) ASSISTED CELLULAR SYSTEM

CROSS-REFERENCE TO RELATED APPLICATION(S)

This application is based on and claims priority under 35 U.S.C. § 119 to Indian Patent Application No. 202241025924, filed Apr. 21, 2023, and Indian Patent Application No. 202241025924, filed May 4, 2022, in the Indian Intellectual Property Office, the disclosures of which are incorporated by reference herein in their entirety.

BACKGROUND

1. Field

The present disclosure relates to a method and a device for an intelligent reflecting surface (IRS) assisted cellular system.

2. Description of the Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Millimeter wave (mmWave) has become a key technology for 5th generation (5G) and 6th generation (6G) mobile communication by virtue of their rich available frequency band. The first serious challenge in implementing mmWave communication is path loss. In order to compensate for the serious path loss of mmWave transmission, a mmWave base station (BS) usually employs a large-scale antenna array for narrow-beam transmission, so that transmission energy can be effectively concentrated in a certain area or direction. However, mmWave directional transmission is very sensitive to blocking and even causes connection interruption, which also brings new challenges to the establishment and maintenance of mmWave links. Particularly, when a blockage occurs, a link between the BS and a user equipment (UE) is terminated and an alternate path is required. For this purpose, intelligent reflective surfaces (IRS) are integrated into the mmWave/terahertz (THz) cellular system.

FIG. 1 illustrates a circuit-level diagram of an IRS in accordance with an embodiment of the present disclosure. As shown in FIG. 1, the IRS 100 comprises of various components such as a control circuit board 101, a copper backplane 103, and a panel 105. The panel 105 comprises of various reflecting elements/meta-atoms 107. The IRS 100 is controlled by an IRS controller 109. The IRS controller 109 communicates with other nodes in the cellular system (such as IRS, BS, UE) and adjusts the phases and amplitudes of the reflecting elements 107. Block 111 illustrates equivalent circuit of the reflecting elements 107. Hence, the IRS 100 is a digitally-controlled meta surface with massive low-cost passive reflecting elements (each able to induce an amplitude/phase change in the incident signal). The IRS 100 also has a low energy consumption (without the use of any transmit radio frequency (RF) chains), and provide high spectral efficiency (i.e., full-duplex, noiseless reflection).

Further, to obtain a large passive beamforming gain of the IRS 100, the IRS 100 needs to perform passive beam training in conjunction with the active beam training of BS and UE to maximize beamforming efficiency. One of the well-known techniques for beam training is exhaustive search and for every connection re-establishment, the same exhaustive beam training protocol is used (when multiple attempts to connect to alternate beams are unsuccessful). However, the exhaustive beam training for finding optimal transmitting-receiving (Tx-Rx) beam pairing of BS-IRS and IRS-UE links requires a large amount of time. This typically gets worse for highly mobile users, as the training needs to be performed often.

FIG. 2 illustrates various stages of an IRS beam training protocol in accordance of an embodiment of the present disclosure. As shown in FIG. 2, the beam training protocol 200 is performed with 1 BS, 1 UE (or mobile station (MS)), and 1 IRS. As this is initial beam training, there is no link is formed between the BS and the IRS and no direct link can be formed between the BS and the UE. As shown in FIG. 2, in stage 1 (201), BS and UE are unaware of their optimal Tx-Rx beam pairs. The BS transmits the beams sequentially until all the beams are transmitted. The IRS sequentially retransmits/reflects the individual beams from the BS in different directions. The direction of reflection is controlled by the BS. The UE receives the signals from its receive beams sequentially. In stage 2 (203), the UE knows its optimal Tx-Rx beam pair and the optimal Tx beam from the IRS. The UE transmits the IRS-UE optimal beam information with its optimal Tx-Rx beam. The IRS sequentially retransmits/reflects the individual beams from the UE in different directions. The BS receives the beams sequentially from the IRS.

In stage 3 (205), the BS knows BS-IRS and IRS-UE optimal beam pairs and the UE knows IRS-UE optimal beam pair. The BS transmits with its optimal Tx-Rx beam pair. The IRS reflects with its optimal IRS-UE Tx beam and the UE receives with its optimal Tx-Rx beam pair. Stage 4 (207) is the same as stage 3 (205) but is performed for an uplink. It can be noted that stages 3 and 4 are for acknowledgements. In FIG. 2, $N_B$ depicts a number of beams at the BS, $N_U$ depicts a number of beams at UE, and $N_I$ depicts a number of beams at the IRS. Hence, it can be seen that mmWave systems have a higher number of beams because of narrow beamwidths. Hence, in the exhaustive search, the beam training is done jointly between BS, IRS, and UE. Accordingly, the number of beam scans required for the exhaustive search is $N_B N_I N_U + N_B N_I$. Therefore, the exhaustive method of beam training for BS-IRS and IRS-UE links introduces unwanted latency, which increases further with user mobility.

Hence, there is a need for an alternative method for faster beam training in enabling IRS-assisted communication in the system.

SUMMARY

This summary is provided to introduce a selection of concepts in a simplified format that are further described in the detailed description of the present disclosure. This summary is not intended to identify key or essential inventive concepts of the present disclosure, nor is it intended for determining the scope of the present disclosure.

In an embodiment, the present disclosure refers to a method performed by a base station (BS) in an intelligent reflecting surface (IRS) assisted cellular system. The method includes configuring the IRS in a retro-reflection mode to reflect a received beam in same direction of reception of the beam. The method further includes determining a BS optimal transmitting-receiving (Tx-Rx) beam pair for a BS-IRS link, while a user equipment (UE) of the IRS assisted cellular system is in an idle state. Thereafter, the method includes configuring the IRS to reflect a beam from the UE, transmitted through a UE optimal Tx-Rx beam pair, while the BS of the IRS assisted cellular system is in an idle state. The method further includes configuring the IRS to determine an IRS optimal Tx-Rx beam pair for an IRS-UE link and receiving signalling information transmitted by the UE indicating the IRS optimal Tx-Rx beam pair of the IRS for IRS-UE link. The method then includes transmitting to the UE, a beam through the BS optimal Tx-Rx beam pair which is received at the UE through the UE optimal Tx-Rx beam pair, wherein the IRS reflects the beam transmitted by the BS to the UE through the IRS optimal Tx-Rx beam pair.

In another embodiment, a base station (BS) in an intelligent reflecting surface (IRS) assisted cellular system is disclosed. The BS comprises a transceiver and a processor. The processor is configured to configure the IRS in a retro-reflection mode to reflect a received beam in same direction of reception of the beam, determine a BS optimal transmitting-receiving (Tx-Rx) beam pair for a BS-IRS link, while a user equipment (UE) of the IRS assisted cellular system is in an idle state, configure the IRS to reflect a beam from the UE, transmitted through a UE optimal Tx-Rx beam pair, while the BS of the IRS assisted cellular system is in an idle state, configure the IRS to determine an IRS optimal Tx-Rx beam pair for an IRS-UE link, receive signalling information transmitted by the UE indicating the IRS optimal Tx-Rx beam pair of the IRS for IRS-UE link and transmit to the UE, a beam through the BS optimal Tx-Rx beam pair which is received at the UE through the UE optimal Tx-Rx beam pair, wherein the IRS reflects the beam transmitted by the BS to the UE through the IRS optimal Tx-Rx beam pair.

In yet another embodiment, the present disclosure refers to a method for beam training for an intelligent reflecting surface (IRS) assisted cellular system. The method includes configuring, by a base station (BS) of the IRS assisted cellular system, the IRS in a retro-reflection mode to reflect a received beam in same direction of reception of the beam. The method further includes determining, by the BS, a BS optimal transmitting-receiving (Tx-Rx) beam pair for a BS-IRS link, while a user equipment (UE) of the IRS assisted cellular system is in an idle state. Thereafter, the method includes determining, by the UE, a UE optimal Tx-Rx beam pair for a UE-IRS link, while the BS is in an idle state. The method further includes configuring, by the BS, the IRS to determine an IRS optimal Tx-Rx beam pair for an IRS-UE link and receiving, by the BS, signalling information transmitted by the UE indicating the IRS optimal Tx-Rx beam pair of the IRS. The method then includes transmitting, by the BS, to the UE, a beam through the BS optimal Tx-Rx beam pair which is received at the UE through the UE optimal Tx-Rx beam pair, wherein the IRS reflects the beam transmitted by the base station to the UE through the IRS optimal Tx-Rx beam pair.

In another embodiment, an intelligent reflecting surface (IRS) assisted cellular system is disclosed. The system comprises a base station (BS) and a user equipment (UE). The BS is configured to: configure the IRS in a retro-reflection mode to reflect a received beam in same direction of reception of the beam and determine a BS optimal transmitting-receiving (Tx-Rx) beam pair for a BS-IRS link, while the UE is in an idle state. The UE is configured to determine a UE optimal Tx-Rx beam pair for a UE-IRS link, while the BS is in an idle state. The BS is further configured to configure the IRS to determine an IRS optimal Tx-Rx beam pair for an IRS-UE link, receive signalling information transmitted by the UE indicating the IRS optimal Tx-Rx beam pair of the IRS for IRS-UE link, and transmit to the UE, a beam through the BS optimal Tx-Rx beam pair which are received at the UE through the UE optimal Tx-Rx beam pair, wherein the IRS reflects the beam transmitted by the base station to the UE through the IRS optimal Tx-Rx beam pair.

In another embodiment, a method performed by a user equipment (UE) in an intelligent reflecting surface (IRS) assisted cellular system, the method comprises determining a UE optimal Tx-Rx beam pair for a UE-IRS link, while a base station (BS) of the IRS assisted cellular system is in an idle state, receiving a beam reflected from an IRS in a retro-reflection mode, wherein the beam is transmitted through the UE optimal Tx-Rx beam pair, transmitting, to the BS, signalling information indicating the UE optimal Tx-Rx beam pair of the IRS, and receiving, from the BS, a beam transmitted through a BS optimal Tx-Rx beam pair, through the UE optimal Tx-Rx beam pair, wherein the IRS reflects the beam transmitted by the BS to the UE through an IRS optimal Tx-Rx beam pair.

A user equipment (UE) in an intelligent reflecting surface (IRS) assisted cellular system, the UE comprises a transceiver and a processor, the processor is configured to determine a user equipment (UE) optimal Tx-Rx beam pair for a UE-IRS link, while a base station (BS) of the IRS assisted cellular system is in an idle state, receive, through the transceiver, a beam reflected from an IRS in a retro-reflection mode, wherein the beam is transmitted through the UE optimal Tx-Rx beam pair, transmit, to the BS through the transceiver, signalling information indicating the UE optimal Tx-Rx beam pair of the IRS, and receive, through the transceiver from the BS, a beam transmitted through a BS optimal Tx-Rx beam pair, through the UE optimal Tx-Rx beam pair, wherein the IRS reflects the beam transmitted by the BS to the UE through an IRS optimal Tx-Rx beam pair.

To further clarify the advantages and features of the present disclosure, a more particular description of the present disclosure will be rendered by reference to specific embodiments thereof, which is illustrated in the appended drawing. It is appreciated that these drawings depict only typical embodiments of the present disclosure and are therefore not to be considered limiting its scope. The present disclosure will be described and explained with additional specificity and detail with the accompanying drawings Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrase.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
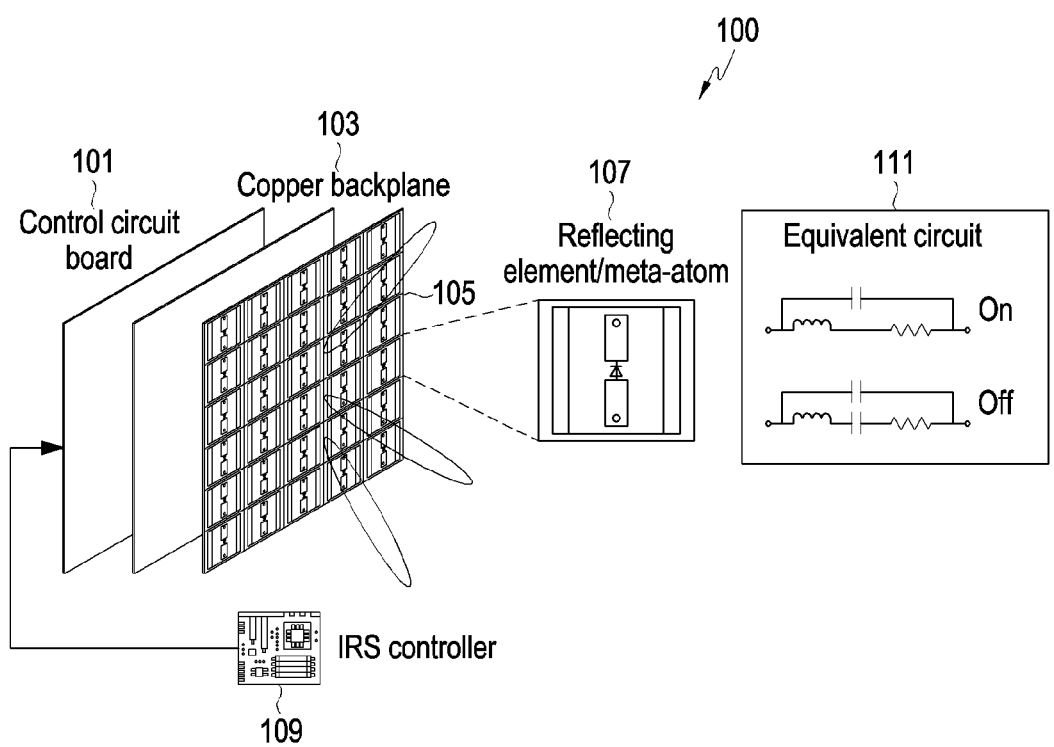
FIG. 1 illustrates a circuit-level diagram of an intelligent reflective surface (IRS) in accordance with an embodiment of the present disclosure.
Figure 2:
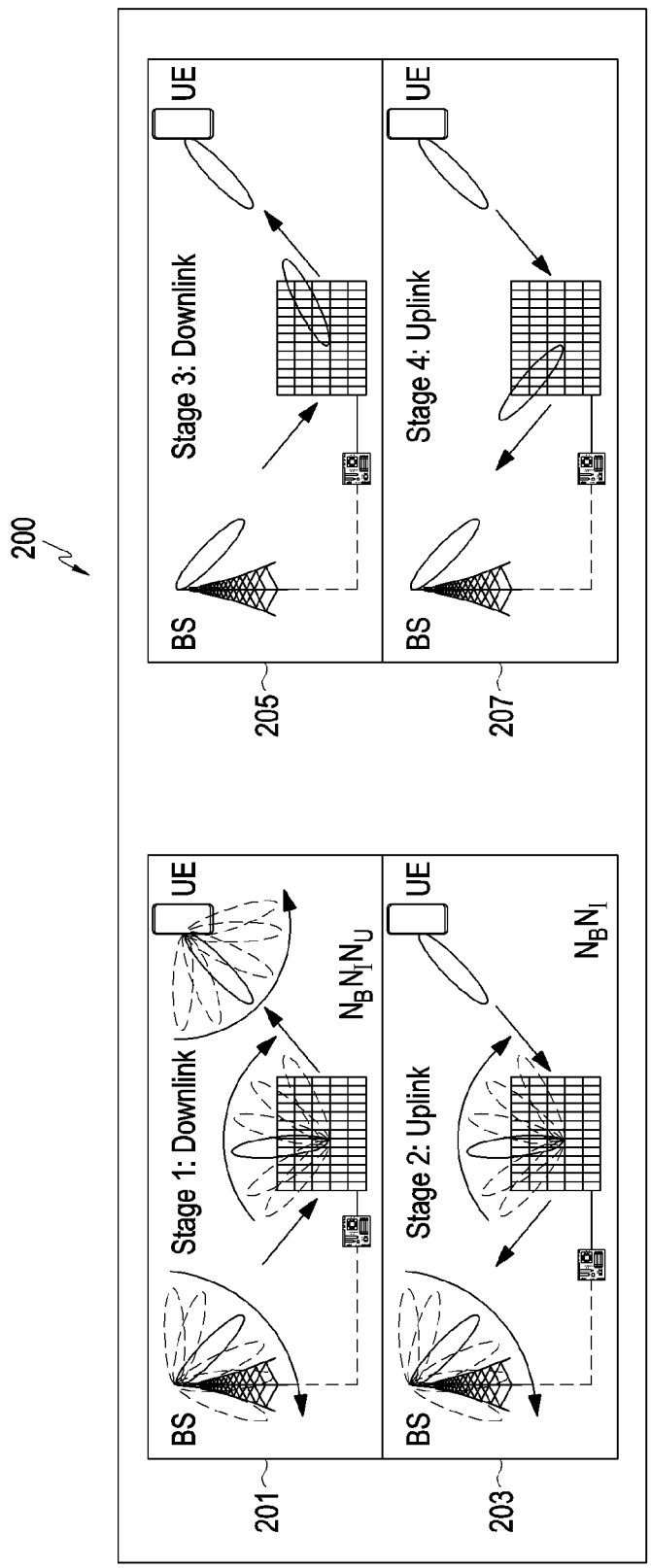
FIG. 2 illustrates various stages of an IRS beam training protocol in accordance with an embodiment of the present disclosure.

Further, skilled artisans will appreciate that elements in the drawings are illustrated for simplicity and may not have been necessarily drawn to scale. For example, the flow charts illustrate the method in terms of the most prominent steps involved to help to improve understanding of aspects of the present disclosure. Furthermore, in terms of the construction of the system, one or more components of the system may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For the purpose of promoting an understanding of the principles of the invention, reference will now be made to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as may normally occur to one skilled in the art to which the present disclosure relates.

It will be understood by those skilled in the art that the foregoing general description and the following detailed description are explanatory of the present disclosure and are not intended to be restrictive thereof. Reference throughout this specification to "an aspect," "another aspect" or similar language means that a particular feature, structure, or characteristic described in connection with the embodiment is included in at least one embodiment of the present disclosure. Thus, appearances of the phrase "in an embodiment," "in another embodiment" and similar language throughout this specification may, but do not necessarily, all refer to the same embodiment.

It is to be understood that the singular forms "a," "an" and "the" include plural referents unless the context clearly dictates otherwise. Thus, for example, reference to "a component surface" includes reference to one or more of such surfaces. "/" represents "and/or," for example, "first/second node" represents the first node and the second node, or the first node or the second node. The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof. The term "or" used in various embodiments of the present disclosure includes any or all of combinations of listed words. For example, the expression "A or B" may include A, may include B, or may include both A and B.

The terms "comprises," "comprising," or any other variations thereof, are intended to cover a non-exclusive inclusion, such that a process or method that comprises a list of steps does not include only those steps but may include other steps not expressly listed or inherent to such process or method. Similarly, one or more systems or sub-systems or elements or structures or components proceeded by "comprises . . . a" does not, without more constraints, preclude the existence of other systems or other sub-systems or other elements or other structures or other components or additional systems or additional sub-systems or additional elements or additional structures or additional components.

Figure 3:
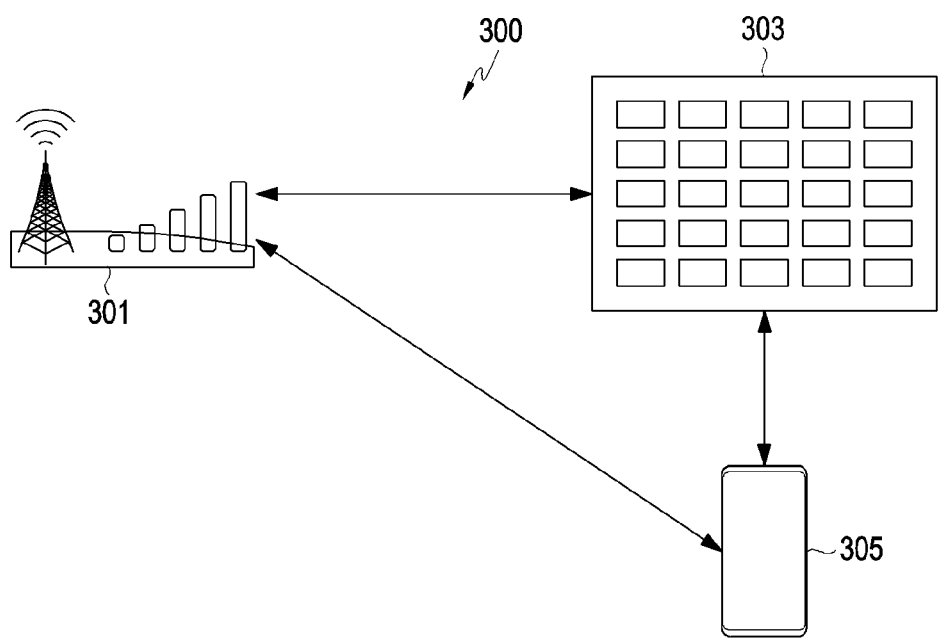
FIG. 3 illustrates an IRS assisted cellular system in accordance with an embodiment of the present disclosure.

FIG. 3 illustrates an intelligent reflecting surface (IRS) assisted cellular system in accordance with an embodiment of the present disclosure. As shown in FIG. 3, the cellular system 300 may include a base station (BS) 301 which is connected to a user equipment (UE) 305 through an IRS (303). It should be noted that even though only one BS and one UE has been shown in FIG. 3, a plurality of BS and UE may be a part of the cellular system 300. Each of the plurality of BS and UE may be connected through the IRS 303. The techniques of the present disclosure have been discussed in reference to FIG. 3.

Figure 4:
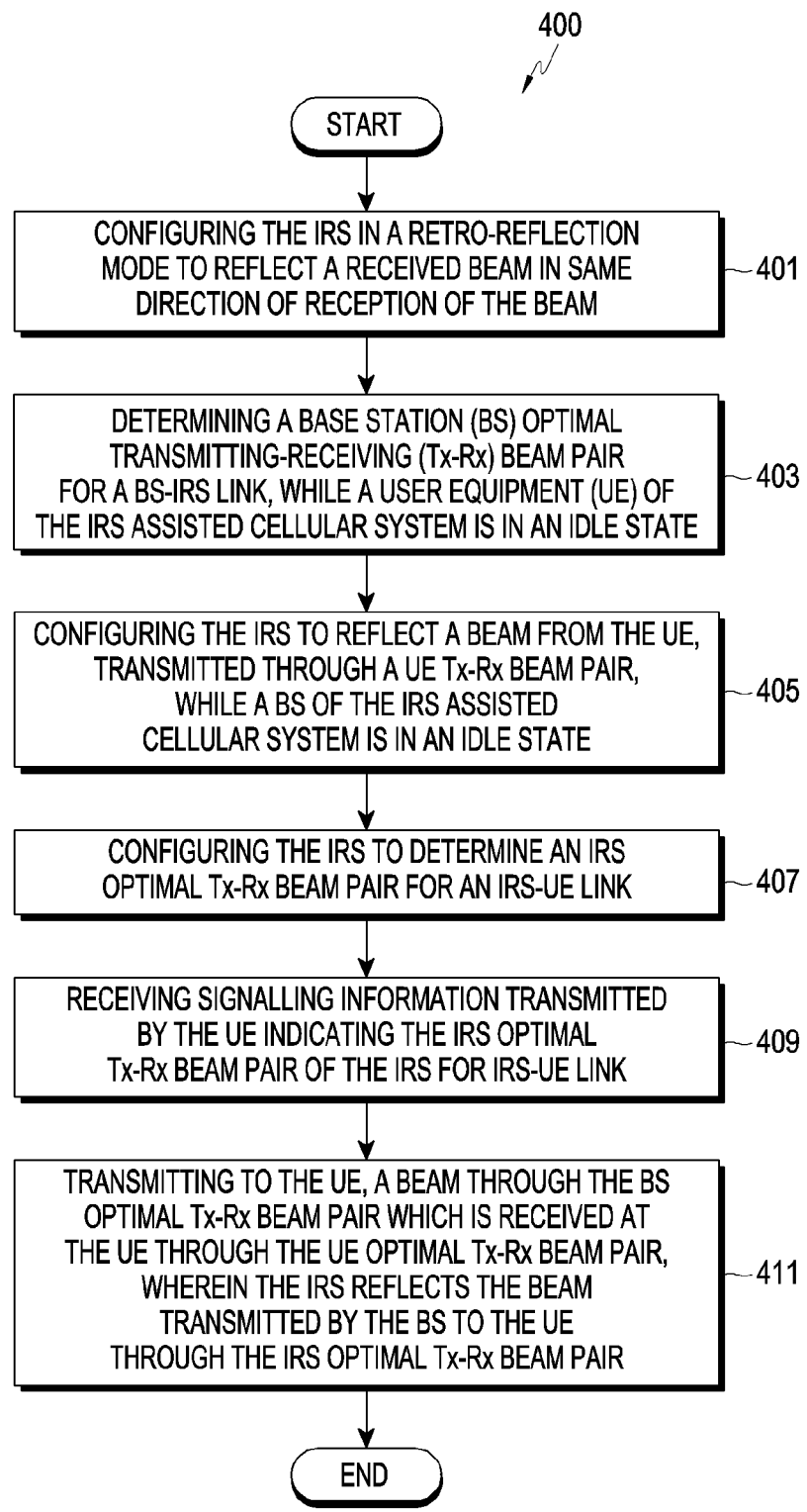
FIG. 4 illustrates a flowchart of a method for beam training for an intelligent reflecting surface (IRS) assisted cellular system in accordance with an embodiment of the present disclosure.
Figure 5:
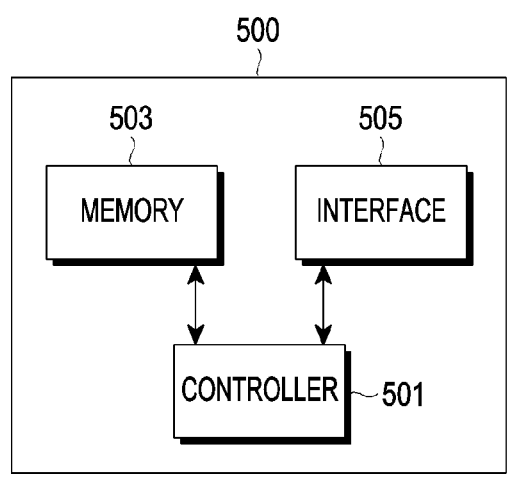
FIG. 5 illustrates f a system for beam training for an intelligent reflecting surface (IRS) assisted cellular system in accordance with an embodiment of the present disclosure.
Figure 6:
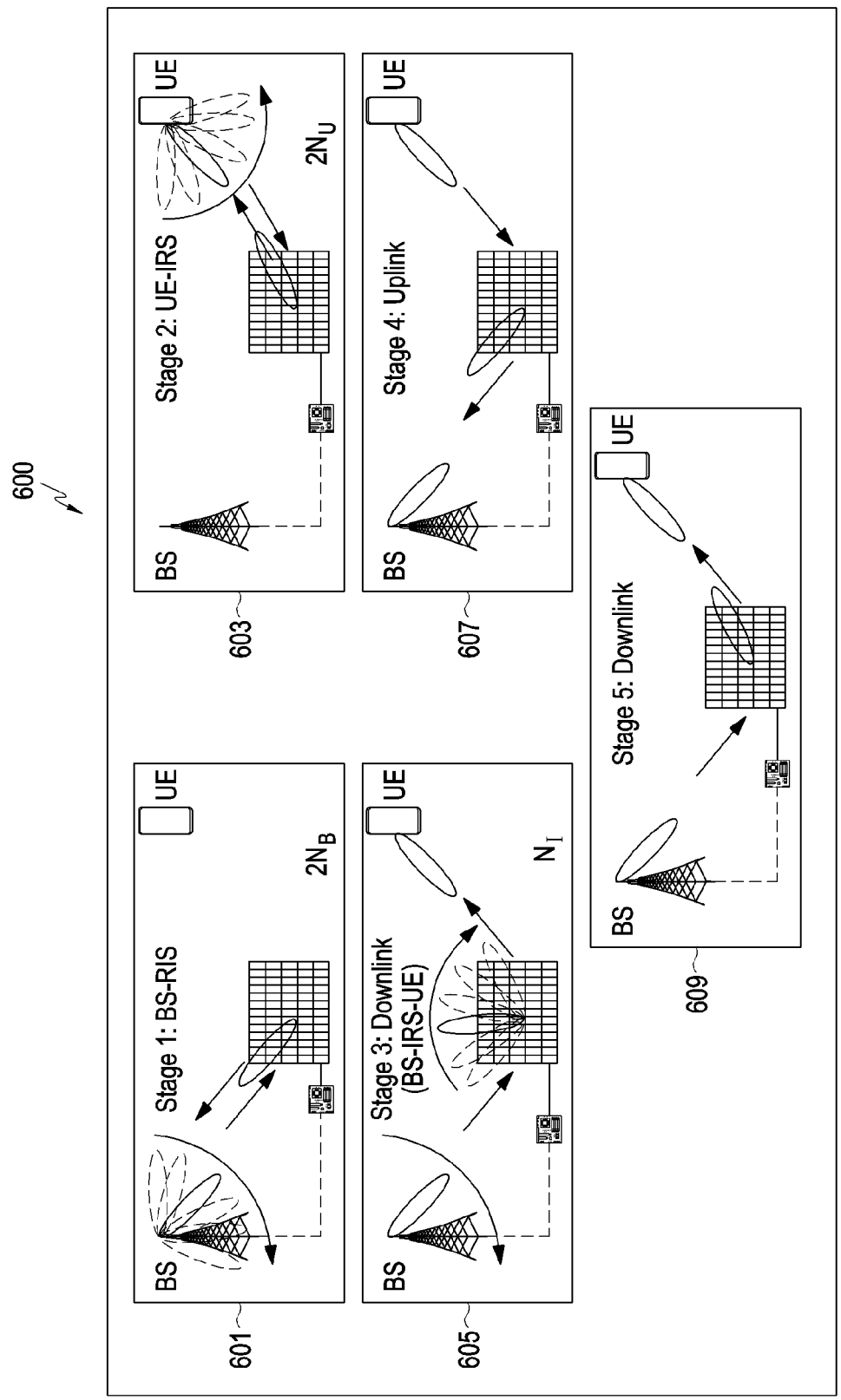
FIG. 6 illustrates various stages of beam training for an intelligent reflecting surface (IRS) assisted cellular system in accordance with an embodiment of the present disclosure.

FIG. 4 illustrates a flowchart depicting a method for beam training for an intelligent reflecting surface (IRS) assisted cellular system in accordance with an embodiment of the present disclosure. FIG. 5 illustrates a block diagram of a system for beam training for an intelligent reflecting surface (IRS) assisted cellular system, in accordance with an embodiment of the present disclosure. FIG. 6 illustrates various stages of beam training 600 for an intelligent reflecting surface (IRS) assisted cellular system, in accordance with an embodiment of the present disclosure. For the sake of brevity, the description of FIGS. 4, 5, and 6 are explained in conjunction with each other.

As shown in FIG. 5, the system 500 may include but is not limited to, a controller 501, a memory 503, and an interface 505. The controller 501 may be coupled to the memory 503 and the interface 505. The interface (or transceiver) 505 may be used to transmit or receive signals from or to the system 500.

The controller (or processor) 501 can be a single processing unit or several units, all of which could include multiple computing units. The controller 501 may be implemented as one or more microcontrollers, microcomputers, microcontrollers, digital signal controllers, central processing units, state machines, logic circuitries, and/or any devices that manipulate signals based on operational instructions. Among other capabilities, the controller 501 is configured to fetch and execute computer-readable instructions and data stored in memory 503.

The memory 503 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an embodiment, the system (or device) 500 may be a part of the BS 301. In another embodiment, the system (or device) 500 may be coupled to the BS 301.

Figure 7A:
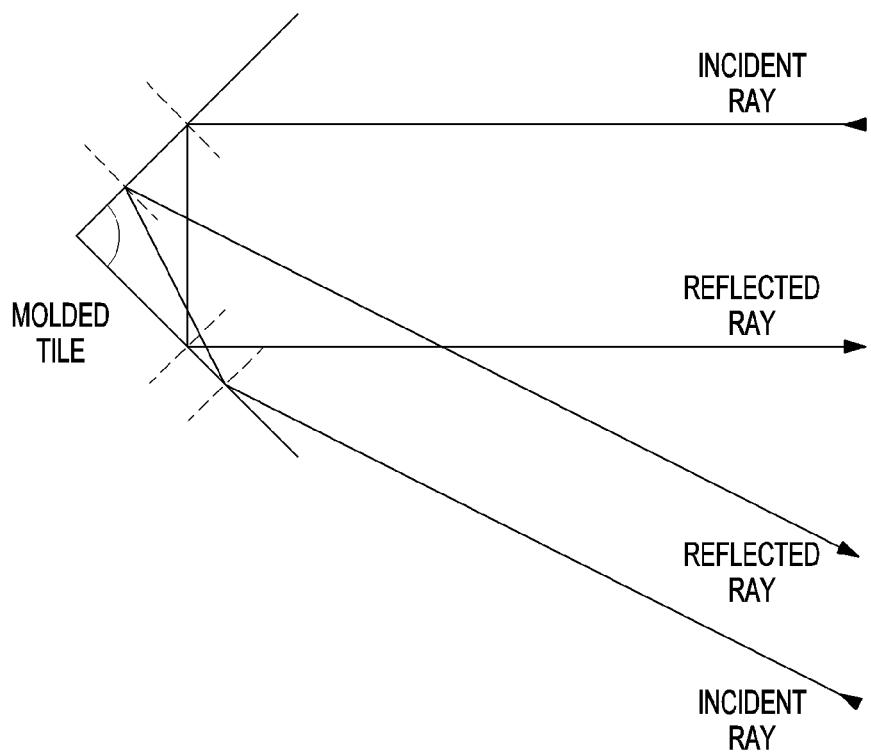
FIG. 7A illustrates a ray diagram of an ideal reflector in accordance with an embodiment of the present disclosure.
Figure 7B:
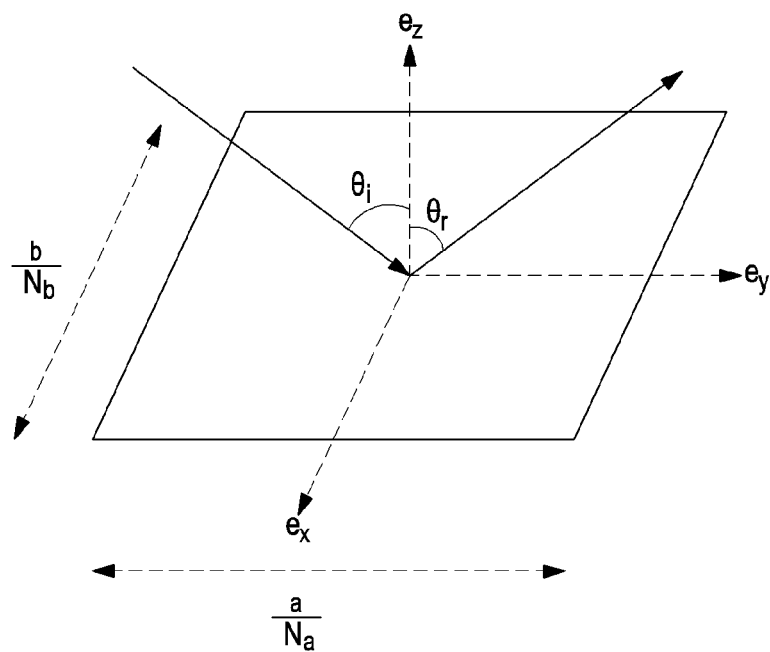
FIG. 7B illustrates a ray diagram of a passive IRS element in accordance with an embodiment of the present disclosure.
Figure 7C:
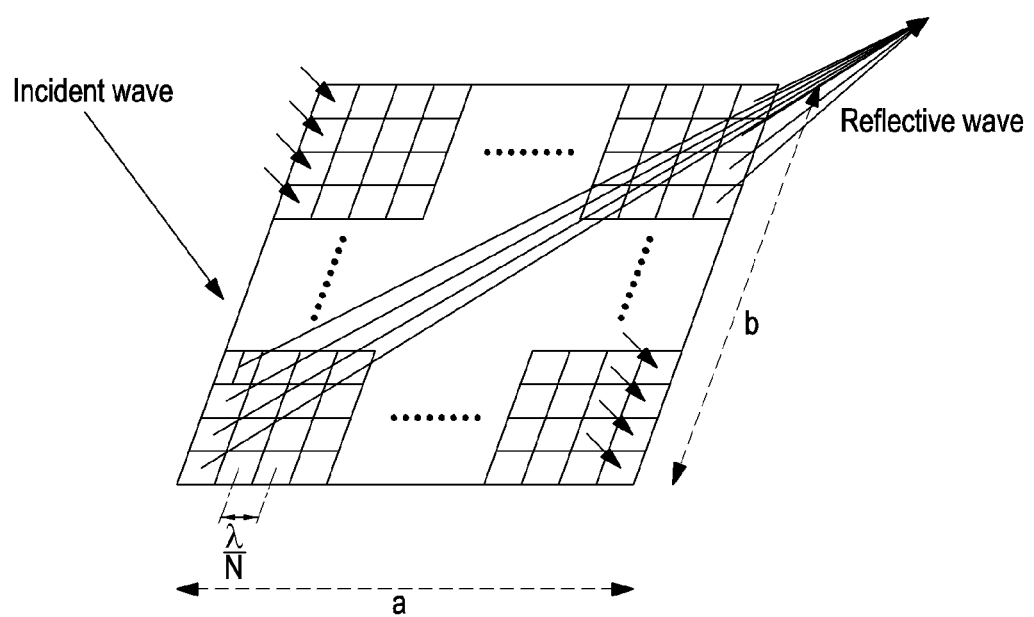
FIG. 7C illustrates an IRS comprising a plurality of passive IRS elements in accordance with an embodiment of the present disclosure.

Referring to FIG. 4, Referring to FIG. 4, at step 401, the method 400 may comprise configuring the IRS 303 in a retro-reflection mode to reflect a received beam in the same direction of reception of the beam. In particular, the retro-reflection mode of the IRS 303 enables the IRS 303 to reflect a received beam in the direction of the source of the beam. FIG. 7A illustrates a ray diagram of an ideal reflector, in accordance with an embodiment of the present disclosure. The ideal reflector undergoes total internal reflection and the normal incident wave may be totally reflected at the normal. However, in the case of an oblique incident wave, the shape of the reflector 700 needs to be adjusted as shown in FIG. 7A. Similarly, in the case of an IRS also, the incident wave/beam is not reflected in the direction of the source, as shown in FIG. 7B. FIG. 7C illustrates an IRS comprising a plurality of passive IRS elements of FIG. 7B in accordance with an embodiment of the present disclosure. In FIG. 7C, Na represents a number of passive IRS elements in "x" direction and $N_b$ represents a number of passive IRS elements in "y" direction.

Hence, to configure the IRS 303 in the retro-reflection mode, phase shifts that create constructive interference in the direction of a source of the beam should be known. This is also true for reflecting on the source. Accordingly, in an embodiment, the controller 501 may configure the IRS 303 in a retro-reflection mode by configuring the IRS 303 to reflect a received beam at a predetermined phase shift. In an embodiment, the predetermined phase shift may be determined based on an incident angle of a beam incident at the IRS 303 and a reflection angle of the beam reflected from the beam. In an embodiment, the incident angle and the reflection angle may be determined based on the location of the IRS 303 and the UE 305. In an embodiment, the BS 301 knows the location of the UE 305. Accordingly, the BS 301 knows x and y coordinates in a 3D cell layout of a network. The BS 301 can determine the incident angle is calculated as: $\theta_i = \tan^{-1}(y/x)$. For retro-reflection, the reflection angle $\theta_r = -\theta_i$.

In an embodiment, the predetermined phase shift may be determined as follows:

The incident and reflective plane wave have the electric field (E-field) distribution as equation 1 below:

$$E_i = E_i e^{-jk(sin(\theta_i)y - cos(\theta_i)z)} e_x$$

$$E_r = E_r e^{-jk(sin(\theta_r)y - cos(\theta_r)z)} e_x \qquad (1)$$

where: $E_i \rightarrow$ Magnitude of the incident wave;
$E_r \rightarrow$ Magnitude of the reflective wave;
$\theta_i \rightarrow$ Incident Angle;
$\theta_r \rightarrow$ Reflective Angle; and
$k \rightarrow 2\pi/\lambda$.

The E-field induces the motion of electrons. The electrons move in the direction of $e_x$, but not in $e_y$ (since the E-field is orthogonal to $e_y$) and also not in the $e_z$-direction since the surface thickness is assumed to be thin.

At the surface (z=0), the superposition of the incident and reflected E-field is as follows equation 2 below:

$$E_t = E_i e^{-jk\, sin(\theta_i)y} e_x + E_r e^{-jk\, sin(\theta_r)y} e_x \qquad (2)$$

Accordingly, the predetermined phase shift may be determined as equation 3 below:

$$\phi_r(y) = \angle\left(\frac{E_r e^{-jksin(\theta_r)y}}{E_i e^{-jksin(\theta_i)y}}\right) = -ksin(\theta_r)y + ksin(\theta_i)y \qquad (3)$$

Hence, as the phase shift has been predetermined for the IRS 303, the IRS 303 reflects the received beam at the predetermined phase shift. For example, if the BS 301 transmits a beam at an angle of 30 degrees, then the BS 301 configures the phase shifts at the IRS 303 such that the IRS 303 reflects the beam at an angle of −30 degrees.

Figure 8:
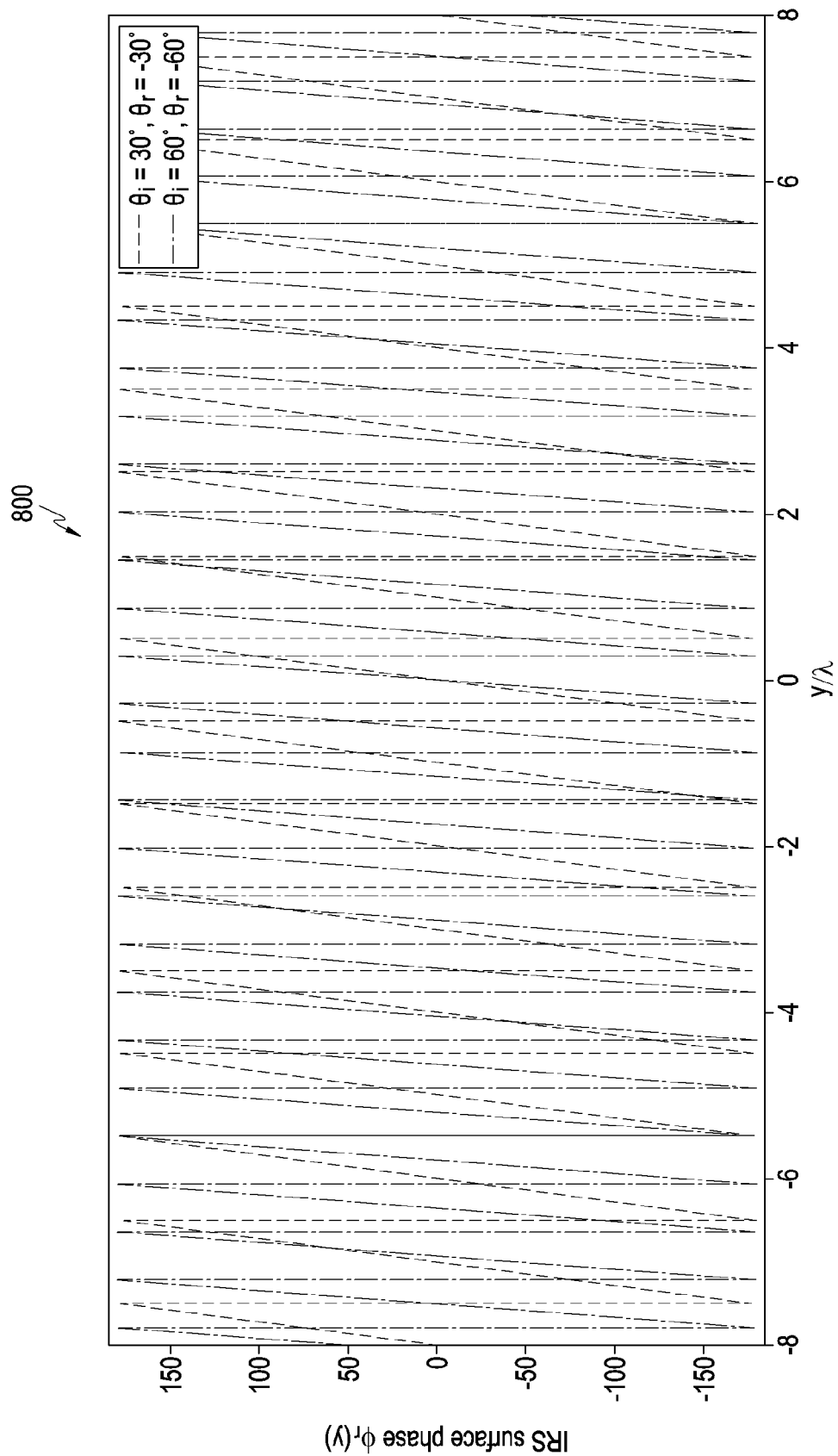
FIG. 8 illustrates a graphical representation of the phase shift $\phi_r(y)$ required to reflect the incident wave with $\theta_i$ in a desired direction $\phi_r$ in accordance with an embodiment of the present disclosure.

FIG. 8 illustrates a graphical representation 800 depicting the phase shift $\phi_r(y)$ required to reflect the incident wave with $\theta_i$ in a desired direction $\theta_r$ in accordance with an embodiment of the present disclosure. As shown in FIG. 8:
Incident Angle, $\theta_i = [30, 60]$;
Reflective Angle, $\theta_r = [-30, -60]$;
Carrier frequency, $f_c = 4$ GHz;
$y = [-8,8]\lambda$; and
$a = b = 16\lambda$ where a and b are dimensions of the IRS (length and width), $\lambda$ is wavelength of carrier frequency, and y is position of the IRS element in the layout of the network.

Hence, it is feasible for the IRS 303 to provide a phase shift of 180° as long as the phase shifts of the IRS elements are precisely controlled at respective positions. In addition, it can be seen that when $\theta_i$ or $\theta_r$ is closer to normal, the variation in $\phi_r(y)$ is less.

Figure 10:
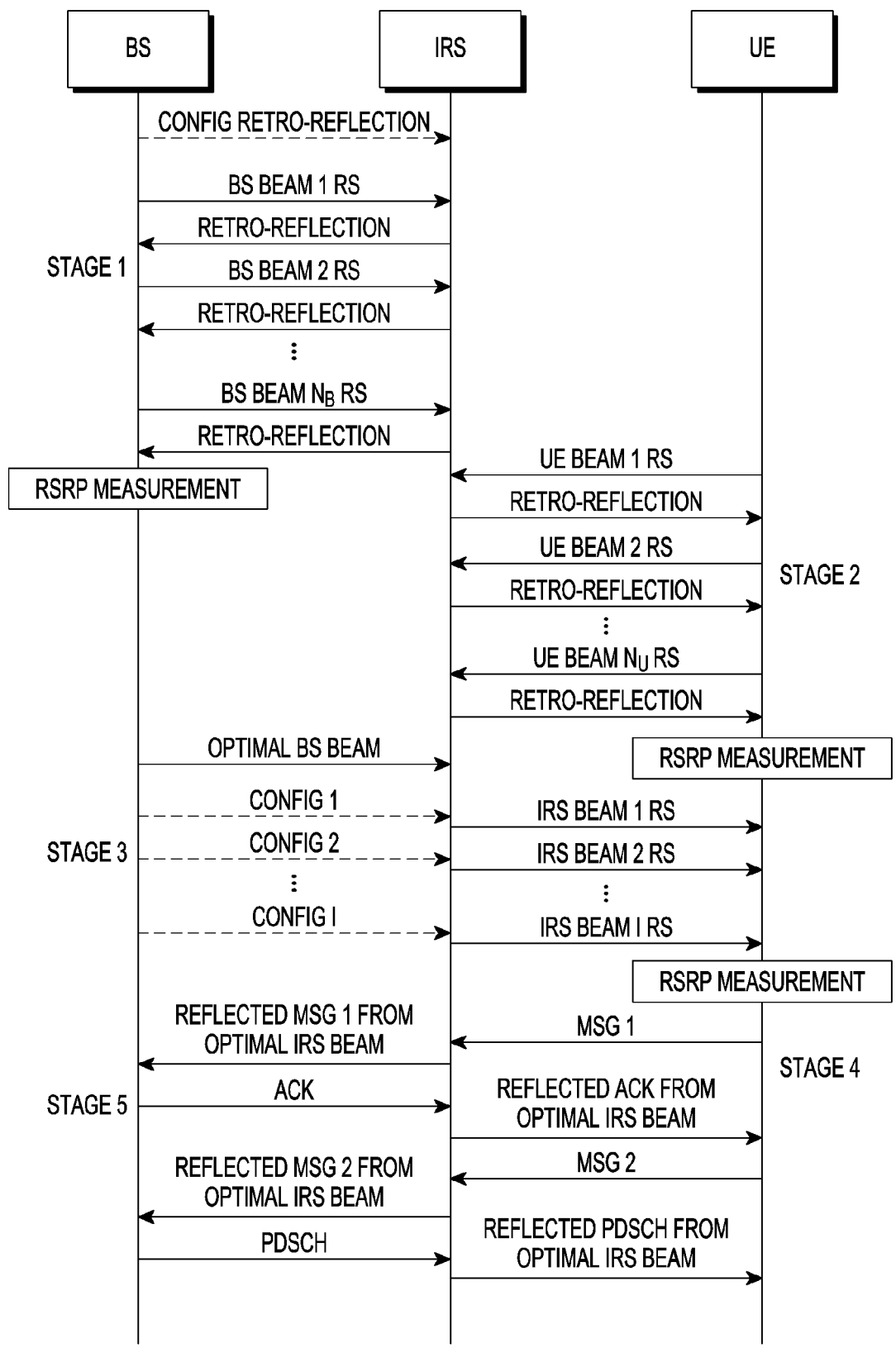
FIG. 10 illustrates a signal flow diagram of a method for beam training for an IRS assisted cellular system in accordance with an embodiment of the present disclosure.

Referring back to FIG. 4, at step 403, the method 400 may comprise determining a base station (BS) optimal transmitting-receiving (Tx-Rx) beam pair for a BS-IRS link. At this stage, the UE 305 is in an idle state. For example, as shown in FIG. 6, at stage 1 (601), the controller 501 transmits a plurality of beams to the IRS 303. In response, the controller 501 at the BS 301 receives a plurality of reflected beams corresponding to the plurality of transmitted beams from a same direction of the transmission. Hence, the IRS 303 reflects the individual beams from and to the BS, using the retro reflection mode implemented at the IRS 303. The direction of reflection is very close to the direction of incidence. Further, the controller 501 may determine a reference signal received power (RSRP) value for each of the received plurality of reflected beams, as shown in FIG. 10.

In an embodiment, the controller 501 may determine the RSRP value for each of the received plurality of reflected beams using techniques known to a person skilled in the art. Then, the controller 501 may determine the BS optimal Tx-Rx beam pair corresponding to the received plurality of reflected beams with the highest RSRP value. For example, if the RSRP value for each of the received plurality of reflected beams is R1, R2 ... Rn and Rn is the highest value, then the reflected beam corresponding to Rn may be considered as the optimal Rx beam for the BS optimal Tx-Rx beam pair. In a further embodiment, the controller 501 may determine the RSRP value using one of a synchronization signal block (SSB) present in a MeasResult IE, a channel state information reference signal (CSI-RS) present in the MeasResult IE, and defining a new RS in the MeasResult IE. In an embodiment, the new RS in the MeasResult IE may be defined as shown in TABLE 1.

TABLE 1

A new RS

| |
| --- |
| MeasResultSSBIRS-RSRP-r16 ::= SEQUENCE { |
| ssb-irs-RSRP-Result-r16    SSB-IRS-RSRP-Range-r16 |
| csi-irs-RSRP-Result-r16    CSI-IRS-RSRP-Range-r16 |
| irs-RSRP-Result-r16        IRS-RSRP-Range-r16 |
| } |

Referring back to FIG. 4, at step 405, the method 400 may comprise configuring the IRS 301 to reflect a beam from the UE 305, transmitted through a UE optimal Tx-Rx beam pair. At this stage, the BS 301 is in an idle state. This step is further explained in detail in reference to FIGS. 9 and 11.

Then, at step 407, the method 400 may comprise configuring the IRS to determine an IRS optimal Tx-Rx beam pair for an IRS-UE link. For example, as shown in FIG. 6, at stage 3 (605), the controller 501 configures the IRS 303 to receive a beam from the BS 301, wherein the beam is transmitted through the BS optimal Tx-Rx beam pair. Then, the controller 501 configures the IRS 303 to reflect the received beam in a plurality of directions via a plurality of beams associated with the IRS 303. However, the direction of reflection is controlled by the BS 301. In an embodiment, the BS 301 may control the direction of reflection by adding a predetermined phase shift at the IRS 303. Hence, the IRS 303 reflects the received beam from the BS 301. Further, the reflected beam is received at the UE 305 through the UE optimal Tx-Rx beam pair. The direction of reflection is very close to the direction of incidence. Further, the controller 501 may determine a reference signal received power (RSRP) value for the reflected beam in each of the plurality of the directions, as shown in FIG. 10.

In an embodiment, the controller 501 may determine the RSRP value for the reflected beam in each of the plurality of the directions using techniques known to a person skilled in the art. Then, the controller 501 may determine the IRS optimal Tx-Rx beam pair corresponding to the highest RSRP value. For example, if the RSRP value for the reflected beam in each of the plurality of the directions is R1, R2 ... Rn, and Rn is the highest value, then the reflected beam in a direction corresponding to Rn may be considered as the optimal Rx beam for the IRS optimal Tx-Rx beam pair. In a further embodiment, the controller 501 may determine the RSRP value using one of a synchronization signal block (SSB) present in a MeasConfig IE and adding a new element in the MeasConfig IE. In an embodiment, the new element in the MeasConfig IE may be added as shown in TABLE 2.

TABLE 2

A new element

| |
| --- |
| MeasConfig ::=              SEQUENCE { |
| ... |
| s-MeasureConfig             CHOICE { |

TABLE 2-continued

A new element

| |
| --- |
| ssb-RSRP          RSRP-Range, |
| csi-RSRP          RSRP-Range, |
| srs-irs-RSRP      RSRP-Range, |
| irs-RSRP          RSRP-Range |
| } |
| .... |
| } |

Then, at step 409, the method 400 may comprise receiving signalling information transmitted by the UE indicating the IRS optimal Tx-Rx beam pair of the IRS for IRS-UE link. In particular, the BS 301 and the UE 305 are now aware of their optimal Tx-Rx beam pair, but the BS 301 needs to know the optimal Tx-Rx beam pair between the IRS 303 and the UE 305. Accordingly, as shown in FIG. 6, at stage 4 (607), the UE 305 transmits a beam with the UE optimal Tx-Rx beam pair. The IRS 303 transmits with the IRS optimal Tx beam between the BS 301 and the IRS 303. Then, the BS 301 receives with the BS optimal Tx-Rx beam pair. Hence, the BS 301 transmits with the BS optimal Tx beam and the UE 305 receives with the UE optimal Rx beam. There is a plurality of beams (i.e., $N_I$ beams) at the IRS 303 which the BS 301 configures sequentially until all beams are reflected. The indexes of the IRS beams are based on timing. For instance, beam 1 is reflected at t0, beam 2 is reflected at t1, and so on. At the UE 305, the RSRP value is measured for all the beams and estimates that 2 (for example) is the beam with the highest RSRP value. So, this index (i.e., 2) information is transmitted to the BS 301 via the IRS 303 by the UE 305. Now, since the BS 301 now knows that beam 2 is best for the IRS-UE link, the BS 301 uses that link in the next stages. In a further embodiment, the BS 301 may receive the signalling information from the UE indicating the IRS optimal Tx-Rx beam pair of the IRS for IRS-UE link via a sounding reference signal (SRS). In continuation with the above example, the UE 305 may transmit the index value of "2" in the SRS to the BS 301.

Referring to FIG. 4, at step 411, the method 400 may comprise transmitting to the UE 305, a beam through the BS optimal Tx-Rx beam pair which is received at the UE 305 through the UE optimal Tx-Rx beam pair. The IRS 303 reflects the beam transmitted by the BS 301 to the UE 305 through the IRS optimal Tx-Rx beam pair. For example, as shown in FIG. 6, at stage 5 (609), the BS 301 transmits a beam with the BS optimal Tx-Rx beam pair. The IRS 303 reflects with the IRS optimal IRS-MS Tx beam and the UE 305 receives with the UE optimal Tx-Rx beam pair.

Figure 9:
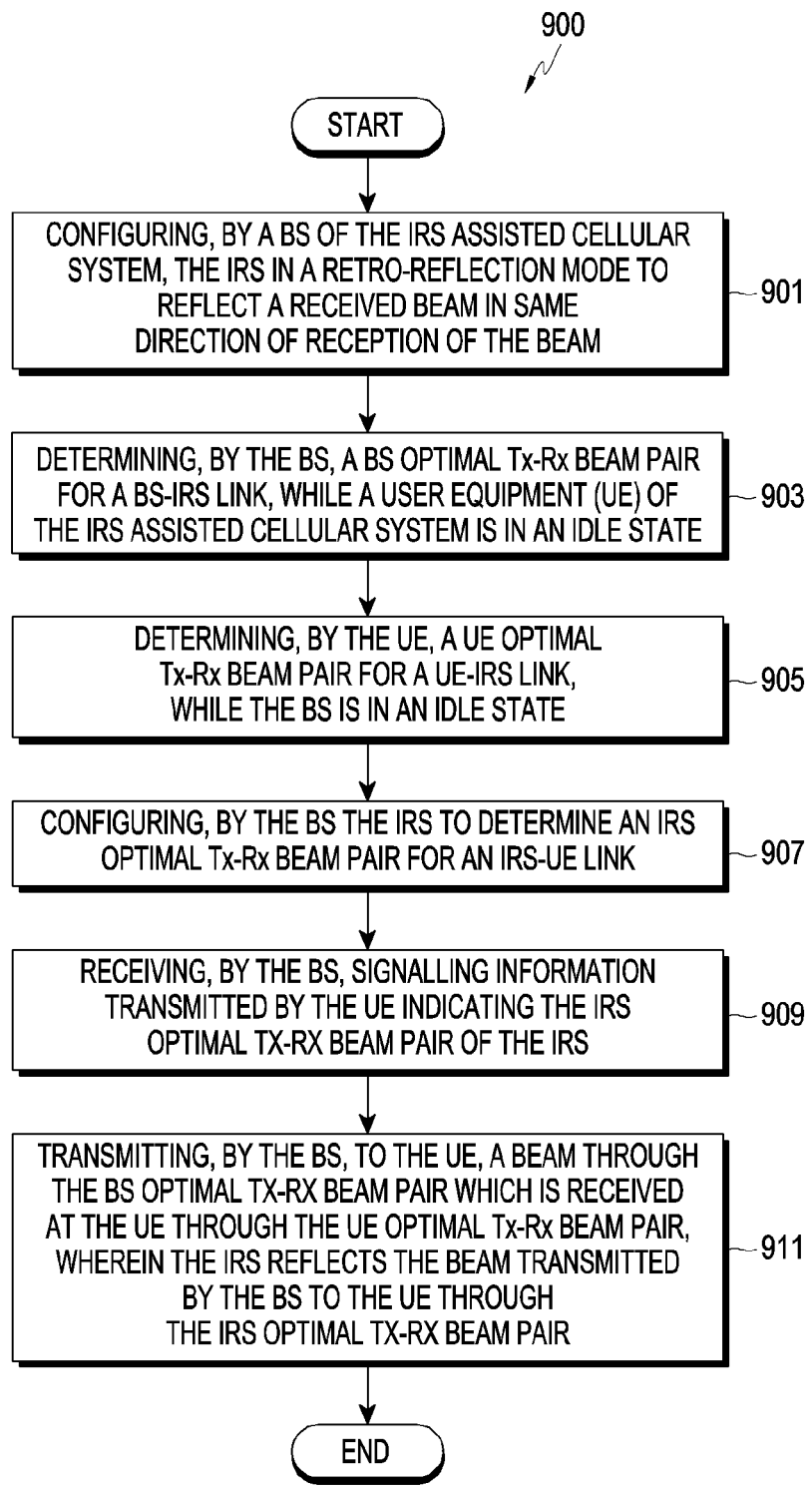
FIG. 9 illustrates a flowchart of a method for beam training for an IRS assisted cellular system in accordance with an embodiment of the present disclosure.

FIG. 9 illustrates a flowchart depicting a method 900 for beam training for an intelligent reflecting surface (IRS) assisted cellular system, in accordance with an embodiment of the present disclosure. As shown in FIG. 9, steps 901-903 and 907-911 are similar to steps 401-403 and 407-411 of FIG. 4. Accordingly, a description of steps 901-903 and 907-911 is not included for the sake of brevity. Moving to step 905, which is corresponding to step 405 of FIG. 4, at step 905, the UE 305 determines a UE optimal Tx-Rx beam pair for a UE-IRS link, while the BS 301 is in an idle state. In an embodiment, as shown in FIG. 6, at stage 2 (603), the UE 305 may transmit a plurality of beams to the IRS 303 through SRS-Config or IRS-RS-Config. Then, the UE 305 may receive a plurality of reflected beams corresponding to the plurality of transmitted beams in the same direction of the transmission. In particular, the IRS 303 reflects the individual beams from and to the UE 305, using the retro reflection mode implemented at IRS 303. The direction of reflection is very close to the direction of incidence. Further, the UE 305 may determine an RSRP value for each of the received beams, as shown in FIG. 10.

In an embodiment, the UE 305 may determine the RSRP value for each of the received beams using techniques known to a person skilled in the art. Then, the UE 305 may determine the UE optimal Tx-Rx beam pair corresponding to the received beam with the highest RSRP value. For example, if the RSRP value for each of the received beams is R1, R2 . . . Rn and Rn is the highest value, then the reflected beam corresponding to Rn may be considered as the optimal Rx beam for the UE optimal Tx-Rx beam pair. In a further embodiment, the UE 305 may determine the RSRP value using one of a sounding reference signal (SRS) present in a MeasConfig IE and adding a new element in the MeasConfig IE.

Further, it should be noted that the method as described in FIG. 9 may be performed by the IRS assisted cellular system 300 of FIG. 3. Further, it should be noted that the method as described in FIG. 4 may be performed by the system (or device) 500 of FIG. 5 or the base station 301 of FIG. 3.

Figure 11:
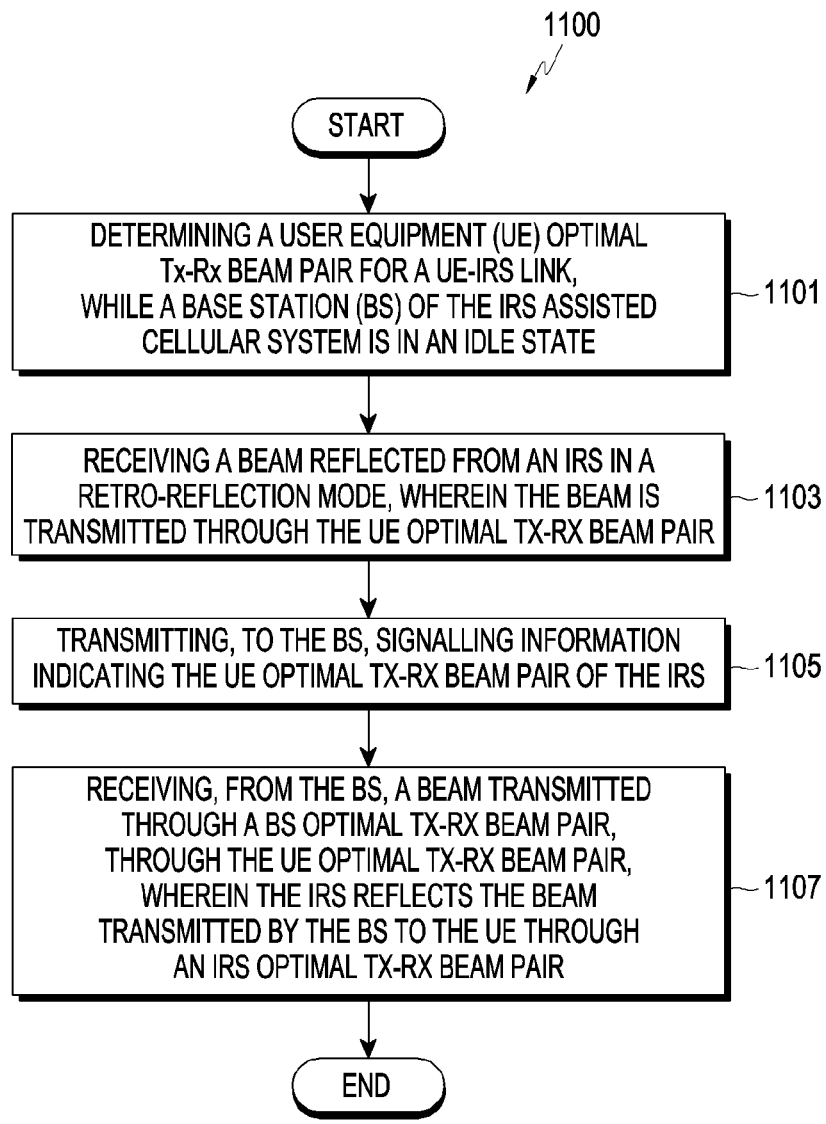
FIG. 11 illustrates a flowchart depicting a method 1100 for beam training for an intelligent reflecting surface (IRS) assisted cellular system in accordance with an embodiment of the present disclosure.

FIG. 11 illustrates a flowchart depicting a method 1100 for beam training for an intelligent reflecting surface (IRS) assisted cellular system in accordance with an embodiment of the present disclosure. As shown in FIG. 11, steps 1103-1107 are similar to steps 401-403 and 407-411 of FIG. 4. Accordingly, a description of steps 1103-1107 is not included for the sake of brevity. Moving to step 1101, which is corresponding to step 405 of FIG. 4, at step 1101, the UE 305 determines a UE optimal Tx-Rx beam pair for a UE-IRS link, while the BS 301 is in an idle state. In an embodiment, as shown in FIG. 6, at stage 2 (603), the UE 305 may transmit a plurality of beams to the IRS 303 through SRS-Config or IRS-RS-Config. Then, the UE 305 may receive a plurality of reflected beams corresponding to the plurality of transmitted beams in the same direction of the transmission. In particular, the IRS 303 reflects the individual beams from and to the UE 305, using the retro reflection mode implemented at IRS 303. The direction of reflection is very close to the direction of incidence. Further, the UE 305 may determine an RSRP value for each of the received beams, as shown in FIG. 10.

In an embodiment, the UE 305 may determine the RSRP value for each of the received beams using techniques known to a person skilled in the art. Then, the UE 305 may determine the UE optimal Tx-Rx beam pair corresponding to the received beam with the highest RSRP value. For example, if the RSRP value for each of the received beams is R1, R2 . . . Rn and Rn is the highest value, then the reflected beam corresponding to Rn may be considered as the optimal Rx beam for the UE optimal Tx-Rx beam pair. In a further embodiment, the UE 305 may determine the RSRP value using one of a sounding reference signal (SRS) present in a MeasConfig IE and adding a new element in the MeasConfig IE.

Figure 12:
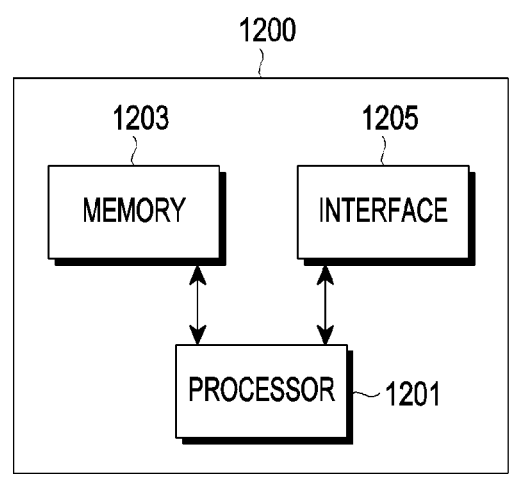
FIG. 12 illustrates a block diagram of a system for beam training for an intelligent reflecting surface (IRS) assisted cellular system in accordance with an embodiment of the present disclosure.

FIG. 12 illustrates a block diagram of a system for beam training for an intelligent reflecting surface (IRS) assisted cellular system in accordance with an embodiment of the present disclosure.

As shown in FIG. 12, the system 1200 may include but is not limited to, a processor 1201, a memory 1203, and an interface 1205. The processor 1201 may be coupled to the memory 1203 and the interface 1205. The interface (or transceiver) 1205 may be used to transmit or receive signals from or to the system 1200.

The processor 1201 can be a single processing unit or several units, all of which could include multiple computing units. The controller 501 may be implemented as one or more microcontrollers, microcomputers, microcontrollers, digital signal controllers, central processing units, state machines, logic circuitries, and/or any devices that manipulate signals based on operational instructions. Among other capabilities, the processor 1201 is configured to fetch and execute computer-readable instructions and data stored in memory 1203.

The memory 1203 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an embodiment, the system (or device) 1200 may be a part of the UE 305. In another embodiment, the system 1200 may be coupled to the UE 305.

Further, it should be noted that the method as described in FIG. 11 may be performed by the system 1200 of FIG. 12 or the user equipment 305 of FIG. 3.

Hence, in accordance with the techniques of the present disclosure, the beam training are done individually for BS-IRS and UE-IRS links in Stages 1 and 2. Following the present disclosure, the indispensability for joint BS-IRS-UE beam training is eliminated and the overhead is reduced significantly. With the retro-reflection and the present disclosure, the number of beam scans required is $2N_B+N_I+2N_U$, where $N_B$ is number of beams transmitted by the BS, $N_I$ is number of beams reflected by the IRS and $N_U$ is number of beams transmitted by the UE.

Accordingly, the present disclosure provides the following technical advantages:

The present disclosure provides a highly efficient and significantly faster method to configure the optimal beams of BS, IRS, and UE;

Since the IRS is not divided into multiple small IRS, the passive beam gain obtained is significantly higher than the prior arts where IRS is divided into multiple sub-IRSs for simultaneous beam transmission;

No simultaneous beams are transmitted in the present disclosure. Hence, there is no interference due to simultaneous transmission if the RSs are not orthogonal; and/or The present disclosure provides a better throughput to the UE.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a base station (BS) in an intelligent reflecting surface (IRS) assisted cellular system, the method comprising:
   configuring the IRS in a retro-reflection mode to reflect a received beam in a same direction of a reception of a beam;
   determining a BS optimal transmitting-receiving (Tx-Rx) beam pair for a BS-IRS link while a user equipment (UE) of the IRS assisted cellular system is in an idle state;
   configuring the IRS to reflect a first beam from the UE, transmitted through a UE optimal Tx-Rx beam pair, while the BS of the IRS assisted cellular system is in an idle state;
   configuring the IRS to determine an IRS optimal Tx-Rx beam pair for an IRS-UE link;
   receiving, from the UE, signalling information indicating the IRS optimal Tx-Rx beam pair of the IRS for the IRS-UE link; and
   transmitting, to the UE, a second beam through the BS optimal Tx-Rx beam pair that is received through the UE optimal Tx-Rx beam pair, wherein the IRS reflects the second beam transmitted by the BS to the UE through the IRS optimal Tx-Rx beam pair.

2. The method of claim 1, wherein configuring the IRS in the retro-reflection mode comprises:
   configuring the IRS to reflect the received beam at a predetermined phase shift, wherein the predetermined phase shift is determined based on an incident angle of a beam incident at the IRS and a reflection angle of the beam reflected from the IRS, wherein the incident angle and the reflection angle are determined based on a location of the IRS and the UE.

3. The method of claim 1, wherein determining the BS optimal Tx-Rx beam pair comprises:
   transmitting a plurality of beams to the IRS;
   receiving, from a same direction of a transmission of the plurality of beams to the IRS, a plurality of reflected beams corresponding to the plurality of transmitted beams;
   determining reference signal received power (RSRP) values for each of the received plurality of reflected beams; and
   determining the BS optimal Tx-Rx beam pair corresponding to the received plurality of reflected beams with a highest RSRP value among the RSRP values.

4. The method of claim 3, wherein determining the RSRP values for each of the received plurality of reflected beams comprises:
   determining the RSRP values using one of:
      a synchronization signal block (SSB) present in a MeasResult IE;
      a channel state information reference signal (CSI-RS) present in the MeasResult IE; or
      defining a new RS in the MeasResult IE.

5. The method of claim 1, wherein configuring the IRS to determine the IRS optimal Tx-Rx beam pair comprises:
   configuring the IRS to receive the second beam from the BS, wherein the second beam is transmitted through the BS optimal Tx-Rx beam pair; and
   configuring the IRS to reflect the received beam in a plurality of directions via a plurality of beams associated with the IRS, wherein a direction of reflection is controlled by the BS and wherein the reflected beam is received at the UE through the UE optimal Tx-Rx beam pair;
   determining RSRP values for the reflected beam in each of the plurality of the directions; and
   determining the IRS optimal Tx-Rx beam pair corresponding to the reflected beam with a highest RSRP value among the RSRP values.

6. The method of claim 5, wherein determining the RSRP values for the reflected beams in each of the plurality of the directions comprises:
   determining the RSRP values using one of:
      a synchronization signal block (SSB) present in a MeasConfig IE; or
      adding a new element in the MeasConfig IE.

7. The method of claim 1, wherein receiving the signalling information indicating the IRS optimal Tx-Rx beam pair of the IRS for the IRS-UE link comprises:
   receiving the signalling information via a sounding reference signal (SRS).

8. A base station (BS) in an intelligent reflecting surface (IRS) assisted cellular system, the BS comprising:
   a transceiver; and
   a controller operably coupled to the transceiver, the controller configured to:
      configure the IRS in a retro-reflection mode to reflect a received beam in a same direction of a reception of a beam;
      determine a BS optimal transmitting-receiving (Tx-Rx) beam pair for a BS-IRS link, while a user equipment (UE) of the IRS assisted cellular system is in an idle state;
      configure the IRS to reflect a first beam from the UE, transmitted through a UE optimal Tx-Rx beam pair, while the BS of the IRS assisted cellular system is in an idle state;
      configure the IRS to determine an IRS optimal Tx-Rx beam pair for an IRS-UE link;
      receive, from the UE, signalling information indicating the IRS optimal Tx-Rx beam pair of the IRS for IRS-UE link; and
      transmit, to the UE through the transceiver, a second beam through the BS optimal Tx-Rx beam pair which is received at the UE through the UE optimal Tx-Rx beam pair, wherein the IRS reflects the second beam transmitted by the BS to the UE through the IRS optimal Tx-Rx beam pair.

9. The BS of claim 8, wherein the controller is further configured to:
   configure the IRS to reflect the receive beam at a predetermined phase shift, wherein the predetermined phase shift is determined based on an incident angle of a beam incident at the IRS and a reflection angle of the beam reflected from the IRS, wherein the incident angle and the reflection angle are determined based on a location of the IRS and the UE.

10. The BS of claim 8, wherein the controller is further configured to:
   transmit a plurality of beams to the IRS;

receive, from a same direction of a transmission of the plurality of beams to the IRS, a plurality of reflected beams corresponding to the plurality of transmitted beams;

determining reference signal received power (RSRP) values for each of the received plurality of reflected beams; and determining the BS optimal Tx-Rx beam pair corresponding to the received plurality of reflected beams with a highest RSRP value among the RSRP values.

11. The BS of claim 10, wherein the controller is further configured to:

determine the RSRP values using one of:
a synchronization signal block (SSB) present in a MeasResult IE;
a channel state information reference signal (CSI-RS) present in the MeasResult IE; or
defining a new RS present in the MeasResult IE.

12. The BS of claim 8, wherein the controller is further configured to:

configure the IRS to receive the second beam from the BS, wherein the second beam is transmitted through the BS optimal Tx-Rx beam pair; and configure the IRS to reflect the received beam in a plurality of directions via a plurality of beams associated with the IRS, wherein a direction of reflection is controlled by the BS and wherein the reflected beam is received at the UE through the UE optimal Tx-Rx beam pair;

determining the RSRP values for the reflected beam in each of the plurality of the directions; and determining the IRS optimal Tx-Rx beam pair corresponding to the reflected beam with a highest RSRP value among the RSRP values.

13. The BS of claim 12, wherein the controller is further configured to determine the RSRP values using one of:
a synchronization signal block (SSB) present in a MeasConfig IE; or
adding a new element in the MeasConfig IE.

14. The BS of claim 8, wherein the controller is further configured to receive the signalling information via a sounding reference signal (SRS).

15. A method of a user equipment (UE) in an intelligent reflecting surface (IRS) assisted cellular system, the method comprising:

determining a UE optimal Tx-Rx beam pair for a UE-IRS link, while a base station (BS) of the IRS assisted cellular system is in an idle state;

receiving a first beam reflected from an IRS in a retro-reflection mode, wherein the first beam is transmitted through the UE optimal Tx-Rx beam pair;

transmitting, to the BS, signalling information indicating the UE optimal Tx-Rx beam pair of the IRS; and receiving, from the BS, a second beam transmitted through a BS optimal Tx-Rx beam pair, through the UE optimal Tx-Rx beam pair, wherein the IRS reflects the second beam transmitted by the BS to the UE through an IRS optimal Tx-Rx beam pair.

16. The method of claim 15, determining the UE optimal Tx-Rx beam pair for a UE-IRS link comprises:

transmitting a plurality of beams to the IRS through SRS-Config or IRS-RS-Config;

receiving a plurality of reflected beams corresponding to the plurality of transmitted beams in a same direction of a transmission of the plurality of beams to the IRS;

determining reference signal received power (RSRP) values for each of the received plurality of reflected beams; and determining the UE optimal Tx-Rx beam pair corresponding to the received plurality of reflected beams with a highest RSRP value among the RSRP values.

17. The method of claim 16, wherein determining the RSRP value for each of the received plurality of reflected beams comprises:

determining the RSRP values using one of:
a sounding reference signal (SRS) present in a MeasConfig IE; or
adding a new element in the MeasConfig IE.

18. A user equipment (UE) in an intelligent reflecting surface (IRS) assisted cellular system, the UE comprising:
a transceiver; and
a processor operably coupled to the transceiver, the processor configured to:

determine a UE optimal Tx-Rx beam pair for a UE-IRS link, while a base station (BS) of the IRS assisted cellular system is in an idle state, receive, through the transceiver, a first beam reflected from an IRS in a retro-reflection mode, wherein the first beam is transmitted through the UE optimal Tx-Rx beam pair, transmit, to the BS through the transceiver, signalling information indicating the UE optimal Tx-Rx beam pair of the IRS, and receive, from the BS, a second beam transmitted through a BS optimal Tx-Rx beam pair, through the UE optimal Tx-Rx beam pair, wherein the IRS reflects the second beam transmitted by the BS to the UE through an IRS optimal Tx-Rx beam pair.

19. The UE of claim 18, wherein the processor is further configured to:

transmit, through the transceiver, a plurality of beams to the IRS through SRS-Config or IRS-RS-Config, receive, through the transceiver, a plurality of reflected beams corresponding to the plurality of transmitted beams in a same direction of a transmission of the plurality of beams to the IRS, determine reference signal received power (RSRP) values for each of the received plurality of reflected beams, and determine the UE optimal Tx-Rx beam pair corresponding to the received plurality of reflected beams with a highest RSRP value among the RSRP values.

20. The UE of claim 19, wherein the processor is further configured to determine the RSRP values using one of:
a sounding reference signal (SRS) present in a MeasConfig IE; or
adding a new element in the MeasConfig IE.

* * * * *